Figure 1:
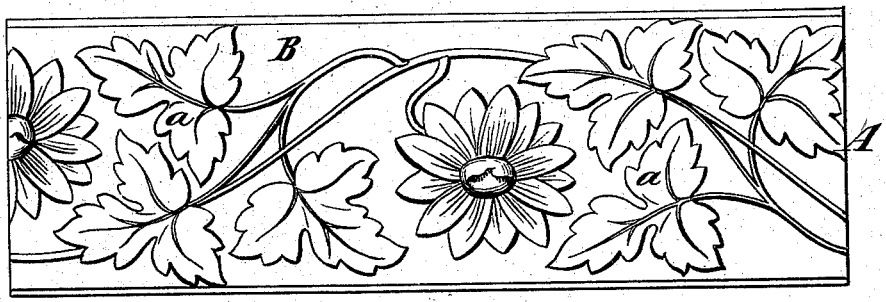

(Model.)

F. J. NEWCOMB.
ORNAMENTING MOLDINGS.

No. 288,473. Patented Nov. 13, 1883.

UNITED STATES PATENT OFFICE.

FREDERICK J. NEWCOMB, OF BROOKLYN, NEW YORK.

ORNAMENTING MOLDINGS.

SPECIFICATION forming part of Letters Patent No. 288,473, dated November 13, 1883.

Application filed May 7, 1883. (Model.)

*To all whom it may concern:*

Be it known that I, FREDERICK J. NEWCOMB, of Brooklyn, in the county of Kings and State of New York, have invented a new and useful Improvement in the Manufacture of Ornamented Moldings, of which the following is a specification.

My invention relates to the manufacture of such ornamented moldings as are intended to be gilt for picture-frames and other purposes.

The ordinary method of manufacturing moldings for gilding is as follows: After the moldings, the bases of which are of wood, have been shaped, those portions of the wood which form the faces of the molding are "prepared" or coated with what is known as "preparation," which consists of glue, whiting, and china-clay, and which is applied by passing the molding through what is called a "preparing-box" containing the preparation. The preparation gives the molding a smooth surface, and, when the moldings are intended to be plain, brings them to a condition for gilding; but when the molding is to be ornamented—that is to say, to have figures on it in intaglio or in low relief—the ornamentation is made separate from the molding by casting it in strips, sheets, or pieces of what is known as "compo," which is a composition requiring to have great tenacity when in a plastic state and very different from the preparation, being composed of glue, rosin, whiting, and pitch. These strips, sheets, or pieces are placed in a plastic state on the prepared molding, and secured thereto either by their own adhesive property or by other adhesive material. The compo is not suitable for gilding upon, and hence before the ornamented molding can be gilt it is necessary to wash it over with preparation like that first applied, but sufficiently thinner to be applied with a brush. This involves four operations to produce from the wooden molding an ornamented molding ready for gilding—viz., first, the preparing; second, the casting of the compo ornamentation; third, the application of the compo ornament to the prepared molding; and, fourth, the washing over the compo with preparation. Moreover, the compo is so tenacious and tough that by its shrinkage in drying it will sometimes produce a distortion or twisting of a light molding or picture-frame to which it is applied. Another difficulty experienced in securing the strips or pieces of compo is that it is difficult to exclude the air from between the strips or pieces and the prepared molding, and consequently air will be held under the said strips or pieces and prevent their perfect adhesion to the prepared molding throughout its extent.

The object of my invention is to simplify the manufacture of ornamented moldings, and to produce a better article at less cost; and to this end the invention consists in first applying the preparation to the shaped molding in the usual way, and then, while the preparation, which is self-adherent to the molding, is in a plastic state, ornamenting its surface by the direct application to it of pressure with a die having upon it the direct pattern. The ornamented molding thus obtained is ready for gilding, having been produced by two operations only, instead of by the four operations which are involved in the old method.

My invention further consists in an ornamental molding for gilding, composed of a wooden base and a directly-applied coating of self-adherent composition in which the ornamentation is produced as distinguished from an ornamented molding as produced by the old process, above described.

Figure 2:
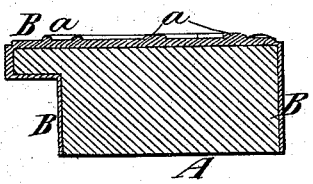

In the accompanying drawings, Figure 1 is a face view, and Fig. 2 a transverse section, of a piece of molding embodying my invention.

Similar letters of reference designate corresponding parts in both figures.

A designates the molding proper or wooden base to which the ornamentation is applied, and B designates the preparation which, in this example of the invention, covers the face and both edges of the molding. The preparation is that usually employed in preparing moldings, and it may be applied by passing the molding through a preparing-box such as is commonly employed. When applied, the preparation has a smooth and uniform surface; but while still in a sufficiently green or plastic state to insure its readily yielding under pressure, I form an ornamentation, *a*, of any suitable pattern, directly on or in its face. This I do by means of a suitable die and pressure. If the ornamentation is to be in relief, as here shown, the die is engraved or otherwise formed with the pattern in intaglio; but if the ornamentation is to be in intaglio, the die would have the pattern in relief. The die may consist of a rotary roller having the pattern formed on its surface, and adapted to operate in connection with a companion roller; or it may consist of a flat plate having the pattern formed upon it. In some cases I may ornament the molding by giving it the appearance similar to egg-shell or torchon paper, or by forming minute recesses—such as would resemble the impressions of a pin-head—at random over its surface. This effect may be produced by a studded roller, or by a board or plate armed with numerous pins or projections. After forming the desired ornamentation on or in the preparation it is allowed to dry, and the ornamented molding is then ready for gilding.

I do not claim, broadly, the ornamentation of wood or wooden moldings by pressure, as I am aware that such ornamentation has been produced in solid wood, and also in a veneer of implastic and non-adhesive material applied to the wood by the aid of glue or other adhesive material distinct from the veneer itself. I am aware that it is not new to produce and apply to a prepared molding by a continuous operation an ornamented strip of compo, and I am also aware that it is not new to ornament a plastered surface by pressing upon the newly-plastered surface a stencil-pattern, whereby the fresh plaster is caused to fill the openings in the pattern, and so produce an ornamentation. I do not desire to include either of the above-described processes in my invention.

By the use of the words "preparation" and "compo" in the foregoing description and claims I mean to cover the compounds which are thus termed in the manufacture of moldings for gilding.

What I claim as my invention, and desire to secure by Letters Patent, is—

1. The improved method of producing ornamented moldings suitable for gilding, consisting in first preparing the wooden base with a self-adherent preparation, such as herein described, and then ornamenting the surface of such preparation by the direct application to it of pressure with a die having upon it or in it the desired pattern for ornamentation, substantially as described.

2. An ornamented molding suitable for gilding, consisting of a wooden base and a directly-applied coating of self-adherent preparation in which the ornamentation is produced, as distinguished from an ornamented molding consisting of a wooden base, a covering of preparation, and superposed strips or pieces of compo bearing the ornamentation and washed over with preparation.

FREDERICK J. NEWCOMB.

Witnesses:
CYRUS MEAD,
JOHN A. ELLIS.